UNITED STATES PATENT OFFICE.

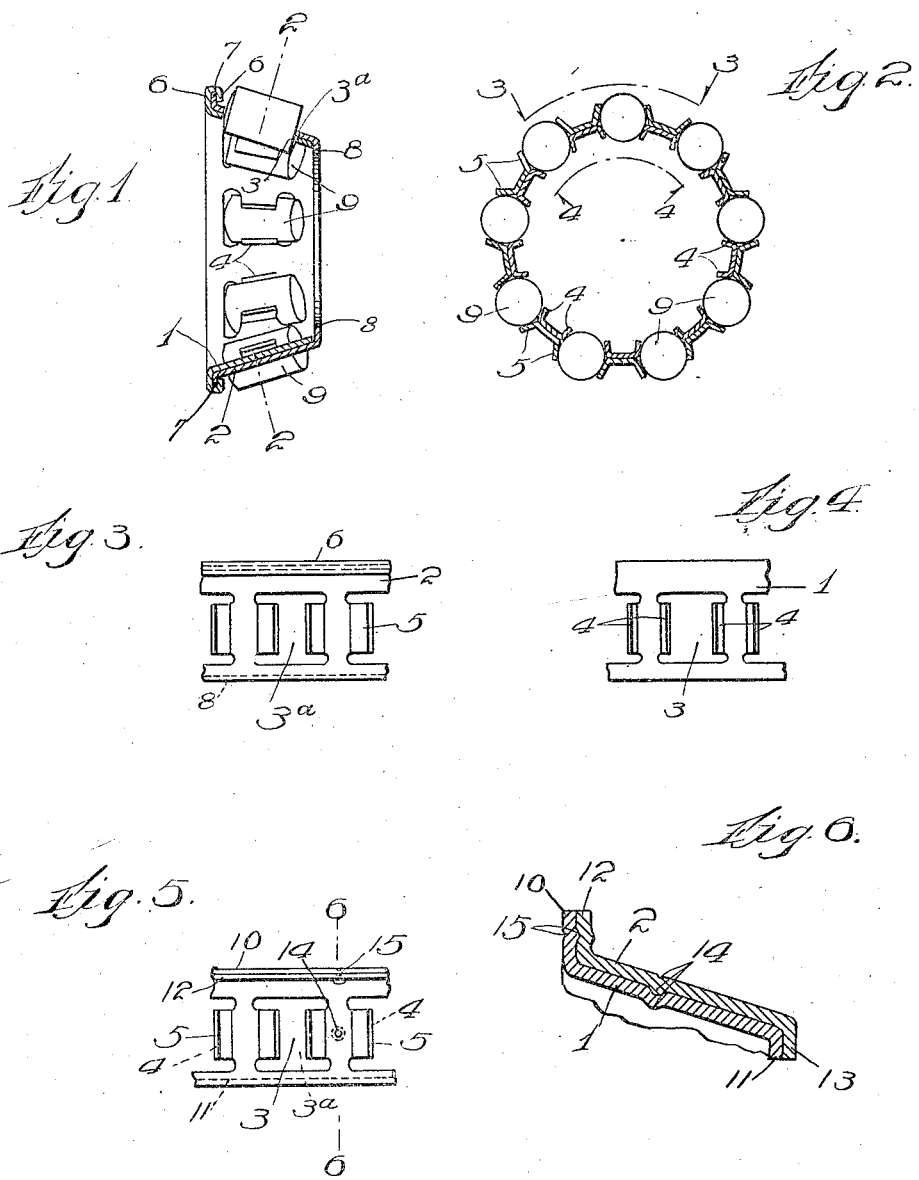

FRANKLIN W. STEWART, OF CHICAGO, ILLINOIS.

ROLLER-BEARING.

1,350,680.

Specification of Letters Patent.  Patented Aug. 24, 1920.

Application filed November 8, 1918. Serial No. 261,616.

*To all whom it may concern:*

Be it known that I, FRANKLIN W. STEWART, a citizen of the United States, residing at Chicago, in the county of Cook and State of Illinois, have invented a certain new and useful Improvement in Roller-Bearings, of which the following is a specification.

This invention relates to roller bearings and has for its object to provide a new and improved device of this description.

My invention has among other objects to provide a roller bearing having two roller retaining sections placed one within the other, said sections having retaining parts, the whole being so constructed as to be light, strong and durable.

The invention is illustrated in the accompanying drawing, wherein—

Figure 1 is a sectional view through a device embodying the invention;

Fig. 2 is a view taken on line 2—2 of Fig. 1;

Fig. 3 is a view taken on line 3—3 of Fig. 2 with the rollers omitted;

Fig. 4 is a view taken on line 4—4 of Fig. 2 with the rollers omitted;

Fig. 5 is a view showing a modified construction with the rollers omitted;

Fig. 6 is a section on the line 6—6 of Fig. 5.

Like parts are indicated by like characters in all the figures.

Referring now to Figs. 1 to 4 inclusive I have shown a construction made up of two roller retaining sections 1 and 2. These sections are preferably conical in shape as illustrated and are placed one in the other when in position. Both of these sections are provided with receiving openings for the rollers, the section 1 having the receiving openings 3 and the section 2 having the receiving openings 3ª. At the edge of the openings 3 of the section 1 are roller retaining projections 4. At the edges of the openings 3ª of the section 2 are roller retaining projections 5. These roller retaining projections 4 and 5 are preferably formed by stamping out the metal when the openings 3 and 3ª are formed and in that event are integral with the material at the edges of the openings. These projections may simply consist of portions of the metal bent outwardly and would preferably have straight or plane faces. The section 2 is preferably provided at one end with a flange 7 and the section 1 is preferably provided at the same end with a flange 6 and this latter flange may be bent down or around the flange 7 as shown in Fig. 1 to hold the two sections together. The outer section 2 may have at its other end a flange 8 while the inner section 1 at this end may be without a flange as shown in Fig. 1, the inner end thereof preferably resting upon or engaging flange 8. In this construction the two roller retaining sections are made separately and are then placed one within the other, the rollers 9 being placed in the openings, during the process of assembling, or by having one set of projections such as 4 or 5 in such a position as to permit the insertion of the rollers, such projections then being bent back to prevent the rollers from coming out. The device as thus assembled is ready for use and may be placed in the hub of a wheel or used in any other connection for which the device is adapted. The construction herein shown is particularly adapted for use with automobile wheels. In Figs. 5 and 6 I have shown a modified construction wherein section 1 is provided at both ends with flanges 10 and 11 while the section 2 is also provided at both ends with flanges 12 and 13, the flanges of one section overlapping the flanges of the other section as shown in Fig. 6. The two sections have openings 3 and 3ª and roller retaining projections 4 and 5 similar to those shown in Figs. 1 and 2. The two sections may be fastened together in any desired manner as for example by means of prick punches 14 in the metal between the openings 3 or prick punches 15 in the flanges.

Any other described method may be used to connect these sections together.

I have described in detail a particular construction embodying the invention, but it is of course evident that the parts may be varied without departing from the invention set forth in the claims hereto appended, and I therefore do not limit myself to the particular construction shown.

I claim:

1. A roller bearing comprising two separate conical shaped roller retaining sections one within the other, the two sections adapted to be slid one within the other until the opposed parts thereof are brought into contact, the two sections fitting closely together, each section being provided with a plurality of openings for the rollers, said openings registering when the sections are in position, roller retaining projections at two opposed edges of the said openings of each section projecting along the faces of the rollers so as to prevent them from coming out of said openings, and means for holding said sections against relative longitudinal movement.

2. A roller bearing comprising two separate conical shaped roller retaining sections one within the other, said sections having openings for the rollers which register when the sections are in position, roller retaining projections at the edges of the openings of each section and projecting along the faces of said rollers so as to prevent them from coming out of said openings, a laterally projecting flange at one end of each of said sections the flange of one section being wider than the flange of the other section and being bent so as to clamp the flange of the other section to hold the two sections together.

3. A roller bearing comprising two separate conical shaped roller retaining sections one within the other each section provided with openings for the rollers, said openings registering when the sections are in position, roller retaining projections at the edges of the openings of said sections which project along the faces of the roller and prevent them from coming out of said openings, lateral projecting flanges at both ends of both of said sections, the flanges of one section overlapping the flanges of the other section.

In testimony whereof I affix my signature this 19th day of October, 1918.

FRANKLIN W. STEWART.